(12) United States Patent
Burgbacher

(10) Patent No.: US 10,755,160 B2
(45) Date of Patent: Aug. 25, 2020

(54) INSERTION BODY, ASSEMBLY OF INSERTION BODIES AND METHOD FOR INSERTING AN INSERTION BODY

(71) Applicant: WeWeWe GmbH, Göppingen (DE)

(72) Inventor: Axel C. Burgbacher, Göppingen (DE)

(73) Assignee: WEWEWE GMBH, Göppingen (DE)

( * ) Notice: Subject to any disclaimer, the term of this patent is extended or adjusted under 35 U.S.C. 154(b) by 0 days.

(21) Appl. No.: 15/576,165

(22) PCT Filed: May 20, 2016

(86) PCT No.: PCT/EP2016/061472
§ 371 (c)(1),
(2) Date: Nov. 21, 2017

(87) PCT Pub. No.: WO2016/188918
PCT Pub. Date: Dec. 1, 2016

(65) Prior Publication Data
US 2018/0157951 A1    Jun. 7, 2018

(30) Foreign Application Priority Data

May 25, 2015 (DE) .................. 10 2015 006 506
May 25, 2015 (DE) .................. 20 2015 003 677 U
(Continued)

(51) Int. Cl.
*G06K 19/077* (2006.01)
*B25B 27/14* (2006.01)
(Continued)

(52) U.S. Cl.
CPC ........ *G06K 19/07758* (2013.01); *B25B 27/14* (2013.01); *B65C 7/00* (2013.01);
(Continued)

(58) Field of Classification Search
CPC ......... G06K 19/07758; G06K 19/0772; G06K 19/07775; G06K 19/02; B25B 27/14;
(Continued)

(56) References Cited

U.S. PATENT DOCUMENTS 4,112,674 A    9/1978  Fesquet
5,733,085 A    3/1998  Shida et al.
(Continued)

FOREIGN PATENT DOCUMENTS

DE       2044030 A1    4/1971
DE       20005975      7/2000
(Continued)

OTHER PUBLICATIONS

Patent Cooperation Treaty, "International Search Report" and English translation thereof, issued in International Application No. PCT/EP2016/061472, by European Searching Authority, document of 6 pages, dated Aug. 22, 2016.
(Continued)

*Primary Examiner* — John C Hong
(74) *Attorney, Agent, or Firm* — Akerman LLP

(57) ABSTRACT

An assembly of a plurality of identical insertion bodies, wherein each insertion body has an RFID tag as an electronic or electromechanical transmitter and/or receiver device. The insertion bodies are connected to one another, one next to the other or one behind the other by one or more connecting elements, wherein the connecting elements are designed to be torn off mechanically by an external force effect on a single insertion body. In this way, the connecting elements can form, when combined as a type of magazine, a linear arrangement for a pneumatic or electrical nail gun device or bolt gun device as an insertion device.

26 Claims, 7 Drawing Sheets

(30) Foreign Application Priority Data

Oct. 26, 2015 (DE) .................. 10 2015 013 722
Oct. 26, 2015 (DE) .................. 20 2015 007 358 U

(51) Int. Cl.
*B65C 7/00* (2006.01)
*F42B 12/36* (2006.01)
*F42B 7/00* (2006.01)
B25C 1/04 (2006.01)
B25C 1/06 (2006.01)
G06K 19/02 (2006.01)

(52) U.S. Cl.
CPC .............. *F42B 7/00* (2013.01); *F42B 12/365* (2013.01); *G06K 19/0772* (2013.01); *B25C 1/04* (2013.01); *B25C 1/06* (2013.01); *G06K 19/02* (2013.01); *G06K 19/07775* (2013.01)

(58) Field of Classification Search
CPC . B65C 7/00; F42B 12/365; F42B 7/00; B25C 1/04; B25C 1/06
See application file for complete search history.

(56) References Cited

U.S. PATENT DOCUMENTS

| | | | |
|---|---|---|---|
| 6,239,737 B1 | 5/2001 | Black | |
| 7,382,260 B2 | 6/2008 | Agarwal et al. | |
| 7,944,355 B2 | 5/2011 | Kumar et al. | |
| 2003/0089771 A1 | 5/2003 | Cybulski et al. | |
| 2005/0013680 A1* | 1/2005 | Karaga | F16B 25/0015 411/386 |
| 2006/0244612 A1 | 11/2006 | Pridmore | |
| 2009/0314664 A1 | 12/2009 | Henke et al. | |
| 2010/0213264 A1 | 8/2010 | Ahokas et al. | |
| 2013/0206028 A1 | 8/2013 | Burdine et al. | |
| 2015/0007741 A1 | 8/2015 | Nath et al. | |
| 2015/0310323 A1* | 10/2015 | Foster | A01F 15/08 56/341 |

FOREIGN PATENT DOCUMENTS

| | | |
|---|---|---|
| DE | 102006015899 | 10/2007 |
| DE | 102006018461 | 10/2007 |
| FR | 2810436 | 12/2001 |
| FR | 2902222 | 12/2007 |
| JP | 2008024329 A | 2/2008 |
| JP | 2011048708 A | 3/2011 |
| RU | 2448026 A | 9/2010 |
| RU | 151062 U1 | 3/2015 |
| RU | 2455683 C2 | 3/2017 |
| SU | 1036519 A1 | 8/1983 |
| WO | 2013087873 | 6/2013 |
| WO | 2014018144 | 1/2014 |
| WO | 2014096554 | 6/2014 |

OTHER PUBLICATIONS

Office Action dated Sep. 4, 2019 issued in connection with corresponding European Patent Application No. 16725480.4.

Notice of Reason for Rejection dated Jan. 24, 2020 issued in connection with corresponding Japanese Patent Application No. 2018-513723.

* cited by examiner

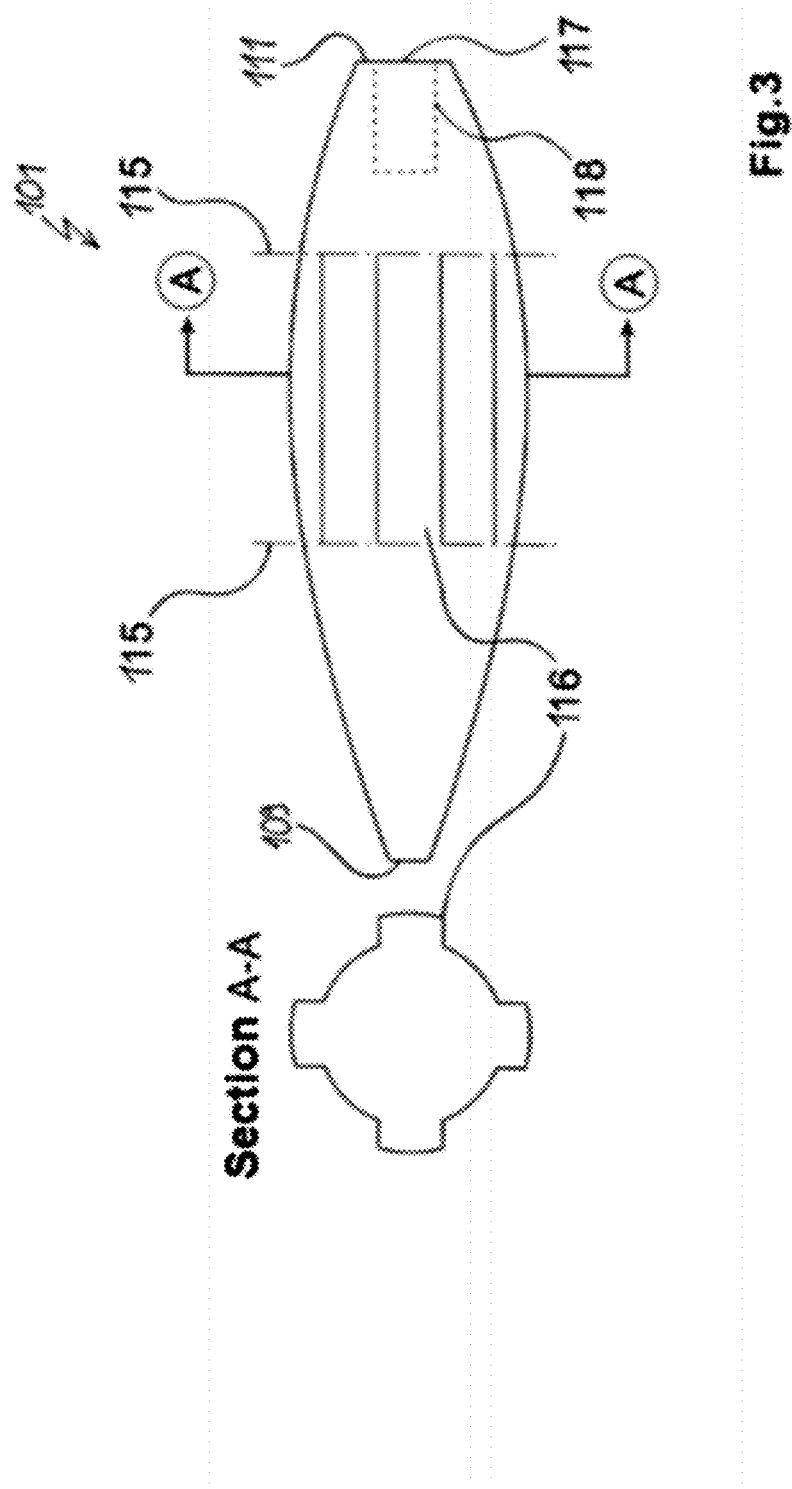

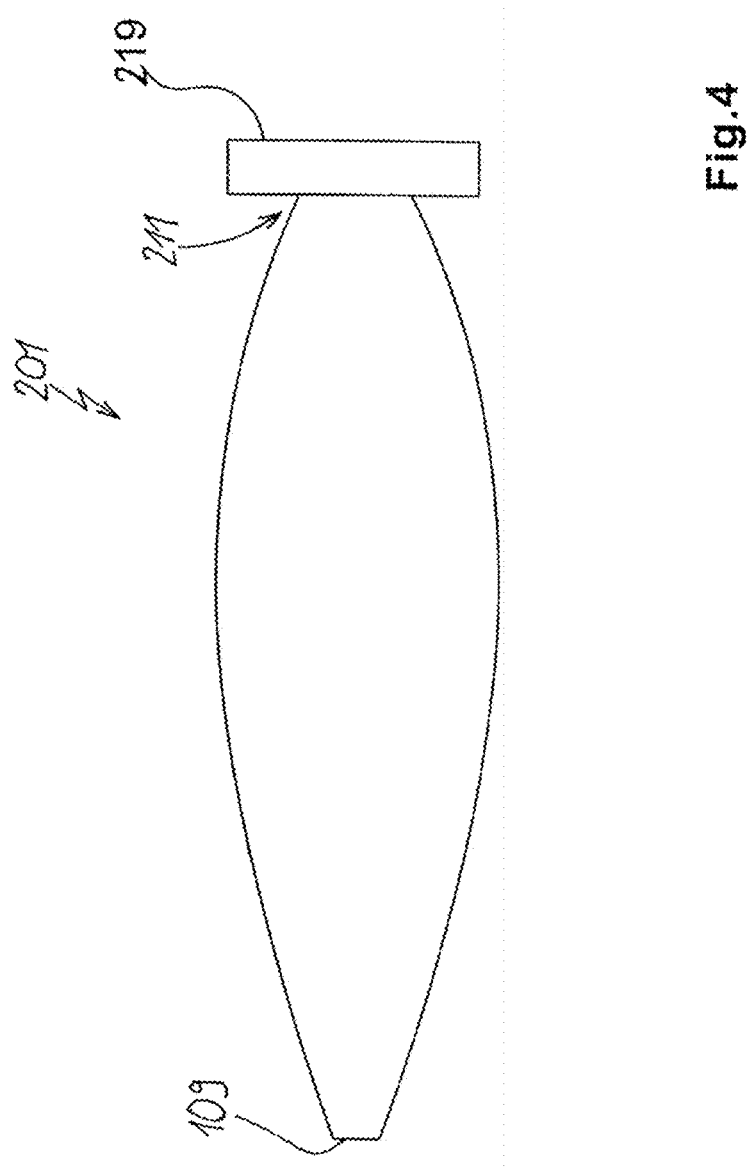

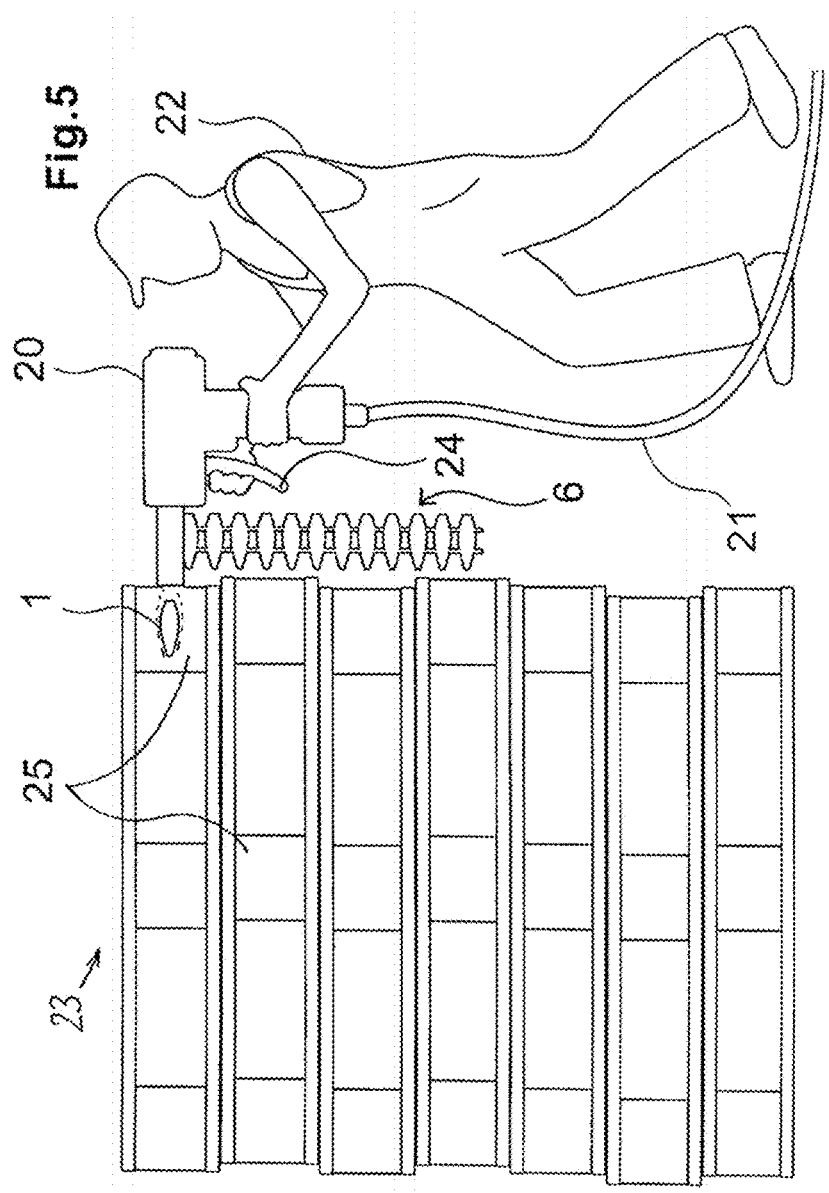

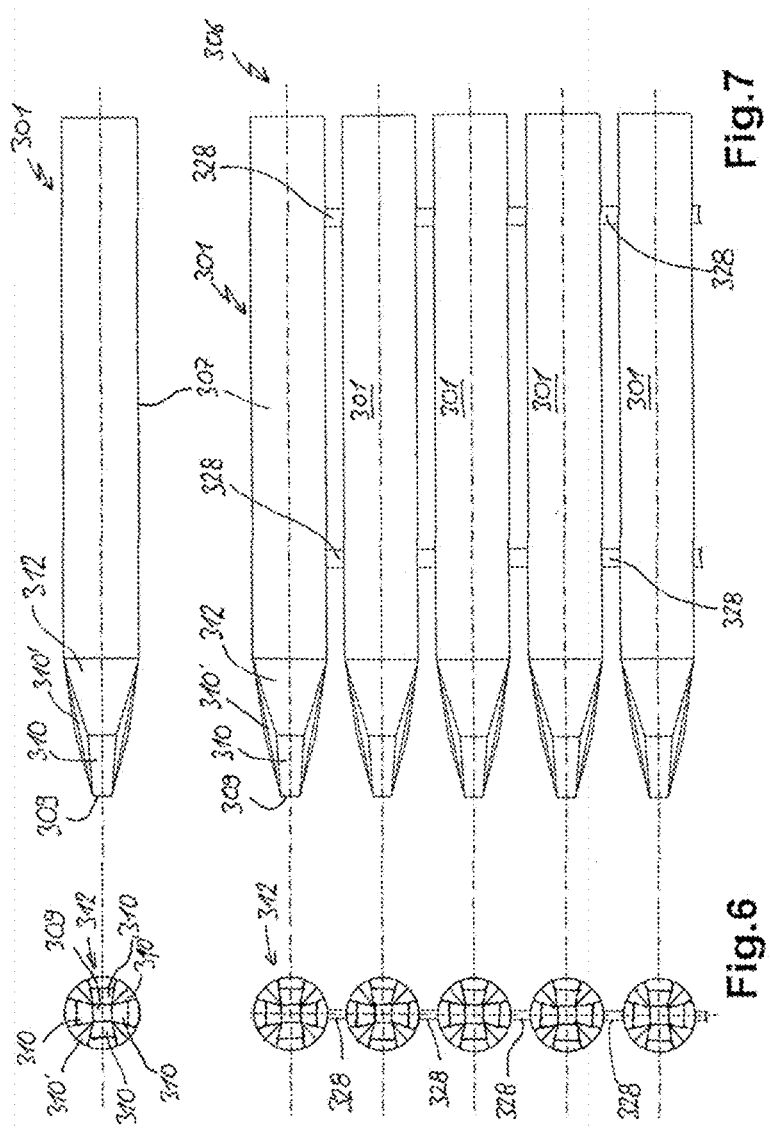

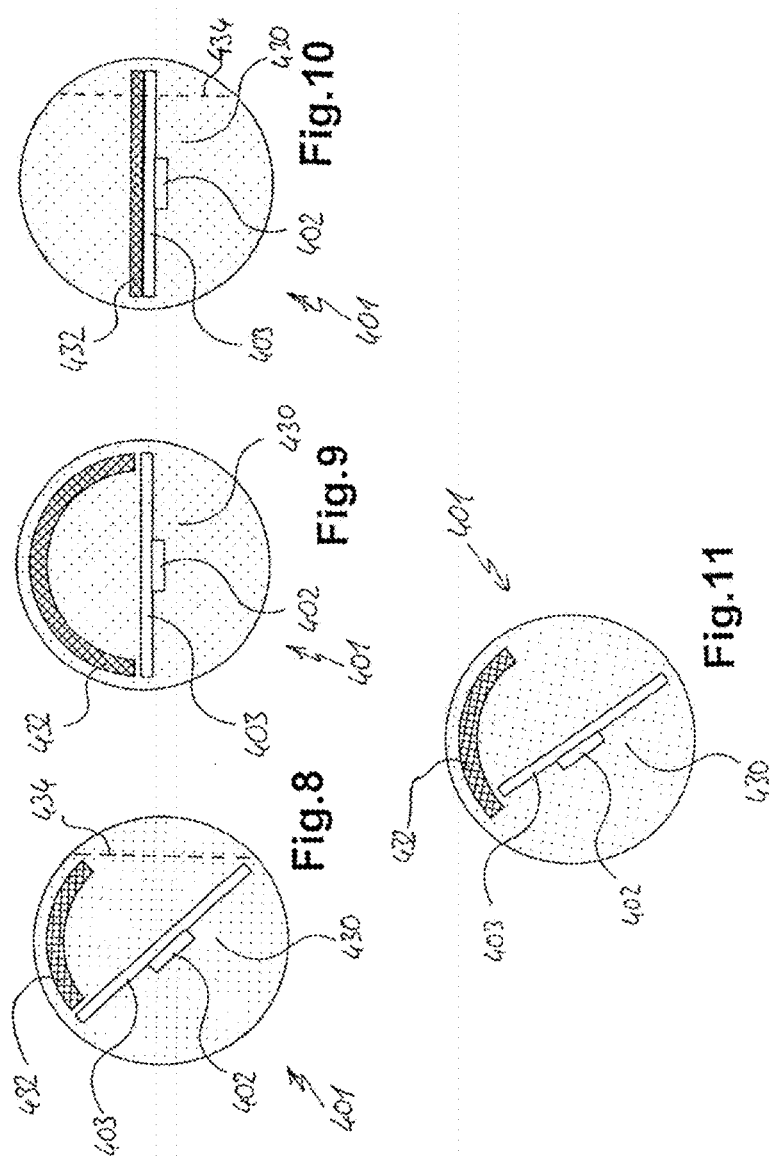

INSERTION BODY, ASSEMBLY OF INSERTION BODIES AND METHOD FOR INSERTING AN INSERTION BODY

CROSS REFERENCE TO RELATED APPLICATIONS

This application is a § 371 National Phase of PCT/EP2016/061472, filed May 20, 2016, the entirety of which is incorporated by reference and which claims priority to German Patent Application No. 10 2015 006 506.8, filed May 25, 2015, German Patent Application No. 20 2015 003 677.5, filed May 25, 2015, German Patent Application No. 10 2015 013 722.0, filed Oct. 26, 2015, and German Patent Application No. 20 2015 007 358.1 filed Oct. 26, 2015, the entireties of which is incorporated by reference.

FIELD OF APPLICATION AND PRIOR ART

The present invention relates to an insertion body for insertion into a transportation receptacle device, an assembly of a plurality of identical insertion bodies, wherein each insertion body has an electronic or electromechanical transmitter and/or receiver device, and a method for inserting an insertion body into a part of a transportation receptacle device.

The marking of objects, components or items by attaching so-called RFID tags is becoming ever more significant. The capability of these tags to be able to read out or write unambiguous or individualizable data in a wireless fashion provides a virtually infinite variety of possibilities of use, ranging from detection to tracking and proof of ownership. RFID tags are available in various designs, ranging from a textile label which can be invalidated to identification cards and key fobs of the size of a shopping trolley chip.

DE 102006018461 A1 describes an RFID chip which is embedded between two glass-fiber-reinforced layers and is of flat design, and has a base layer and a cover layer. This RFID chip is suitable for disk-shaped transponders for which a flat design is particularly important.

WO 2013087873 A1 describes an RFID chip which is configured specifically for vehicle tires and is secured pneumatically by means of a retaining strap. WO 2014096554 A1 shows the embedding of an RFID chip into a housing which is injection molded from plastic and has built-in electronics for rapid attachment to objects for installation and subsequent easy releasability.

However, all these designs do not solve the actual problem stated here. The total costs of a new marking system constitute a decisive factor for the acceptance of this technology despite many technological advantages; in addition to the manufacturing costs of the tag, the time which is necessary to attach the tags to the goods must also be taken into account. Commercial and industrial aspects include not only every second but also the qualification level of the worker who has to attach the system. If this qualification level is high, the costs are, of course, also higher than with less qualified personnel.

OBJECT AND SOLUTION

The invention relates to the object of providing an insertion body of the type mentioned at the beginning, an assembly of a plurality of insertion bodies and a method specified at the beginning, with which problems in the prior art can be solved and with which it is, in particular, possible to provide a multiplicity of items, preferably transportation receptacle devices, with insertion bodies rapidly and easily.

This object is achieved by means of an insertion body having the features of claim 1, an assembly of a plurality of insertion bodies having the features of claim 4 and a method having the features of claim 19. Advantageous and preferred refinements of the invention are the subject matter of the further claims and are explained in more detail below. Many of the following features, and properties, which are, however, not enumerated exhaustively, are described in some cases only for the insertion body or only for the assembly or only for the method. However, irrespective of this, they are intended to be able to apply both to the insertion body and to the assembly or to the method, both in themselves and independently of one another. The wording of the claims is incorporated as content of the description through express reference.

An insertion body for insertion into a transportation receptacle device is of elongate design and has an electronic or electromechanical transmitter and/or receiver device which is formed as an RFID tag or NFC tag. The insertion body is of tapered design at least at one tip. One tip can advantageously generally be formed to a certain extent in a blunt or flattened fashion, preferably on a diameter of the blunt front surface of 3% to 20% of the maximum diameter, particularly preferably 5% to 10%.

Such an insertion body can also be satisfactorily introduced, or for the sake of simplicity inserted, into solid materials such as wood, press board or plastic as well as composite materials formed from these materials. The insertion bodies are advantageously a component of a transportation receptacle device such as a pallet, in particular europallet, a container or the like. The RFID tag or NFC tag on or in the latter then permits, in a way which is known per se in this field, the identification, in particular also a known tracking, of a specified transportation receptacle device. This can considerably simply logistics. In particular, such a identification can, in contrast to an adhesive, paint or the like, not be so easily removed invertently or intentionally. If the insertion body is introduced or inserted to such an extent that it no longer protrudes or is not visible apart from an insertion opening, it is also not disruptive.

In one refinement of the invention, a tip of the insertion body can have at least two longitudinal grooves which run in planes along the longitudinal central axis of the insertion body, preferably even four uniformly distributed longitudinal grooves. These longitudinal grooves can be provided on a tip which is of tapered design, wherein lying between them there can be longitudinal fins which have a constant width. It is therefore possible for the tip to have a shape which is similar to a crosshead screwdriver. As a result, in the case of insertion into wood or pressboard, largely or entirely destruction-free penetration can be made possible.

In one refinement of the invention, an insertion body can be, with the exception of the tapered tip, of cylindrical and straight design, in particular round-cylindrical, to a great extent or over at least 50% or over at least 80% of its length. In this way, it is easier to manufacture and can penetrate the material well.

In a further refinement of the invention, magnetizable or ferritic material can be arranged or provided on or in the insertion body, adjacent to the electronic or electromechanical transmitter and/or receiver device and/or an antenna of the transmitter and/or receiver device. This magnetizable or ferritic material screens the transmitter and/or receiver device and/or the antenna thereof against metallic objects in the vicinity, in particular if they are arranged on or in a transportation receptacle device which is provided with the insertion body in an inventive fashion. The effectiveness or range or detectability of the transmitter and/or receiver device is therefore ensured or at least protected against excessive limitation.

The magnetizable or ferritic material can be arranged in different ways on or in the insertion body. Although it can be adhered or attached on the outside, in particular in a non-detachable fashion, such as for example by being integrally attached by injection molding, there is however the risk here of the material becoming damaged or at least partially removed during the insertion process. For this reason, it is considered preferable if the magnetizable or ferritic material is arranged inside the insertion body, advantageously integrated by injection molding or manufactured together with the insertion body. In this context, the magnetizable or ferritic material can either be introduced as a prefabricated component into an injection molding mold, for example already fastened to the transmitter and/or receiver device and/or the antenna thereof, with the result that the latter form one component. Alternatively, said material can be separately injection molded as a magnetizable or ferritic plastic, in a multi-component injection molding process, as is already known. In this context, magnetic particles may have been previously added to the plastic.

The magnetizable or ferritic material should be arranged at a precisely defined location in the insertion body, specifically such that it screens the transmitter and/or receiver device and/or the antenna thereof upwardly, where metallic objects can be arranged on a corresponding transportation receptacle device. Such a metallic load, for example beverage cans, machine parts, pieces of sheet metal etc. can usually reduce the working distance, i.e. the reading range of an RFID tag, to as low as 5% of the original range, and is therefore extremely damaging. The partial screening of the RFID tag by the magnetizable or ferritic material then acts against the interruption of radial transmission radiation by a metallic load above it.

The magnetizable or ferritic material advantageously covers, as a screen, at least the transmitter and/or receiver device and/or the antenna thereof, and is therefore equally large in terms of surface area. Depending on the arrangement relative to one another, it is also possible for a screen to cover just a portion of the space upwardly, for example just a sector of 45° to 90°, in particular if the screen is bent or extends in a curved fashion. The magnetizing material is, as a curved surface, preferably larger than the transmitter and/or receiver device and projects beyond it one direction with a lateral protrusion everywhere.

Such screening elements made of magnetizable or ferritic material are basically known. It is particularly advantageous for this aspect of the invention if this material is arranged at a defined location in the insertion body, in order to be arranged ultimately in a defined position in the transportation receptacle device or a block of a pallet. Said material should in fact be arranged between the transmitter and/or receiver device and/or the antenna thereof and the metallic objects above them for maximum effectiveness, therefore generally should lie at the top in the enclosed state. In order to ensure this, in a further aspect of the invention it is proposed to permit the insertion of an insertion body into an insertion device only at a precisely defined position, in particular with respect to rotation about a longitudinal axis. In the case of insertion bodies which form a common assembly, according to one aspect of the invention described below this is per se already compulsorily defined. In addition, and in particular in the case of freely moving insertion bodies, alternatively ones which are arranged in magazines individually, there can be provision that they can be introduced into the insertion device only in precisely a single position, by at least one asymmetrical or single-sided depression or notch on the outer surface, in particular on a lateral side. This position should be such that in the case of an insertion device which is secured upright or in the standard fashion the insertion body lies therein and is inserted into a transportation receptacle device in such a way that the magnetizable or ferritic material lies as a screening element above the transmitter and/or receiver device and/or the antenna thereof, that is to say screens the latter upwardly. In principle, the depression or notch should lie on the outer surface, that is to say transversely with respect to a connection axis between the magnetizable or ferritic material and the transmitter and/or receiver device. The depression or notch can advantageously run in a direction transversely with respect to the longitudinal axis of the insertion body and ensure, through a suitable projection in the insertion device, that the insertion body is introduced in a defined fashion and ultimately inserted in a defined fashion into a transportation receptacle device. Two such depressions or notches can be provided on the same side, one in front of the transmitter and/or receiver device and one behind it so that they do not impede said transmitter and/or receiver device or collide with the space required thereby.

In one assembly of a plurality of identical insertion bodies, each insertion body has an electronic or electromechanical transmitter and/or receiver device which is formed as an RFID tag or NFC tag. The insertion bodies are advantageously formed as described above, but do not necessarily have to be.

According to the invention, the insertion bodies are connected to one another next to one another or one behind the other by means of one or more connecting elements, wherein the connecting elements are designed to be torn off mechanically by an external force effect on a single insertion body. They therefore hold the insertion bodies together in the normal state, but become detached or release an insertion body when it is introduced or inserted or generally fastened. This preferably occurs automatically.

A new marking system has therefore been invented which not only permits a single object, such as for example a transportation receptacle device with an insertion body to be marked with an RFID tag or NFC tag within a matter of seconds, but also permits a large number of objects also to be marked in only a few seconds. An individual object would still be able to be marked within an acceptable time with customary attachable tags, but a large number of objects would not.

As a result of the assembly according to the present invention which is held together by means of the connecting elements, the inclusion bodies can also be easily handled in relatively large quantities. The present invention permits machine or device-assisted attachment of RFID tags, preferably in non-metallic objects with a high processing speed. It is possible to mark, for example, a stack of transportation pallets in a very short time, and wooden pallets can be equipped with tags within seconds with a manual working method.

The invention relates to RFID tags which are enclosed, for example, with impact-resistant plastic, ideally encapsulated by injection molding therewith, which tags can certainly also be composed of glass bodies. They are connected to one another by means of small connecting elements and can preferably be manufactured from the same material and in the same injection molding process. The tags or the inclusion bodies can thus be used in customary so-called pneumatic nailers or electric nailers in that they can be plugged into the magazines which are provided for usually metallic nails and bolts. These needle devices permit RFID tags to be mounted within a few seconds in wood, pressed materials, cardboard and other substances which are in a hardness range which permits plastic bolts to penetrate them.

A worker who is equipped with such a pneumatic nailer can in this way realistically provide 10 or more transportation receptacle devices or Euro pallets with tracking-capable RFID tags in 10 seconds. In the process, the tags are shot or inserted deeply and advantageously completely into the wood or the corresponding material and can only be removed again with tools. Even this is possible only by damaging the transportation receptacle device or pallet.

With such RFID insertion bodies it is subsequently possible to sense objects and transportation receptacle devices, here the pallets, quickly and quasi-simultaneously, and this can be used by suitable software for monitoring ownership relationships, transportation paths, reloading operations etc.

In one refinement of the invention, the connecting elements are designed to be mechanically torn off by an external force effect on a single insertion body when the insertion body is inserted.

The insertion is preferably carried out with a driven insertion device which has, in particular, a pneumatic drive or electric drive, alternatively also with explosive or pyrotechnic propellant charges.

The insertion bodies are advantageously arranged in series and connected to one another and form magazines or assemblies in a linear, circular or spiral-shaped arrangement for a pneumatic or electrical nail gun device or bolt gun device which serve as an insertion device.

As an alternative to such a fixed assembly of insertion bodies, an insertion device could also quite generally be provided with a magazine similar to a firearm, into which magazine separate and individuated insertion bodies are introduced or inserted. The similarity of the insertion bodies to cartridges of firearms is, of course, obvious. These advantageously rod-like magazines could then press, by means of internal springs, the individual insertion bodies into the insertion device, for example a pneumatic insertion device, for individual discharging or insertion. Although the charging of the magazines takes a certain time when it is done manually, the insertion bodies can then for this reason be of more simple design.

In one refinement of the invention, the insertion bodies are of tapered design at the end facing away from a tip, preferably with a tapering of the diameter by at least 5%, in particular up to 50%.

In one refinement of the invention, one tip of the insertion body is flattened or tapered by up to 25% of the maximum diameter of the insertion body.

The tip can preferably have a plurality of longitudinal grooves or longitudinal fins, for example two to six, running in the longitudinal direction. These can in fact serve to prevent or reduce the splintering of wood or pressboard.

In one refinement of the invention, the insertion bodies have, at the end facing away from the tip, a plastically deformable face to be marked by die stamps or the like.

In one refinement of the invention, a front region of the insertion body is composed of a harder material than the material of a rear part or of the rest of the insertion body. This is advantageously a tip, which can either be composed of metal or of a harder plastic than the remaining part of the insertion body, preferably by adding fiber components in the tip, preferably with fiber lengths of 5 mm to 15 mm. The front region is particularly advantageously connected in a positive locking and frictionally locking fashion to this rear part.

A polyamide which can be long-carbon-fiber reinforced or at least fiber reinforced and heat stabilized, preferably a partially crystalline polyamide with aromatic components can advantageously generally be used as material at least for a front region of the insertion body or alternatively for the entire insertion body. A length of fibers, in particular glass fibers or carbon fibers, can be approximately 10 mm here, corresponding to a typical granulate size of the polyamide. It is therefore possible to obtain a fiber structure which considerably improves the thermomechanical properties of the insertion body or at least of the front region thereof compared to short-fiber-reinforced products. In the case of use in abovementioned insertion devices, for example compressed air guns, accelerations of far above 2000 g (2000 times the acceleration of the earth) are produced. The significant factor is therefore the combination of a high level of rigidity and exceptional notch impact strength. In industrial applications, the important factor is also a slight change in the properties due to the influence of temperature or moisture as well as excellent fatigue strength with low warpage, in order to avoid adversely affecting the antenna properties of the RFID tag or NFC tag. Such polyamides can therefore serve virtually completely as a substitute for metal, as a precondition for insertion bodies made of plastic which can be introduced or inserted adequately by a machine.

In one refinement of the invention, the insertion body has, in cross-section, symmetrical or asymmetrical arranged longitudinal grooves, extending at least beyond a length part of its maximum diameter. This can serve for directional stabilization during insertion and/or for protection against twisting and/or for promoting fitting into a similar shaped opening according to the key-lock principle.

In one refinement of the invention, the insertion bodies or a sheath or enclosure of the insertion bodies and the connecting elements are composed of the same material and are fabricated, in particular, in an injection molding method in the same process.

In one refinement of the invention, the insertion bodies have, at the end opposite the tip, an opening with a depression which lies behind it and is intended for the insertion of a tool with which the insertion body can be removed again from an object which is equipped with the insertion body. An insertion body can therefore also be removed again. This is advantageously not a standard tool, but instead a special one in order to prevent unauthorized removal.

In one refinement of the invention, the insertion body has, at the end opposite the tip, a disk-shaped platform which serves as a stop for limiting the penetration depth into the object which is to be equipped with the insertion body. It is therefore possible to prevent excessively deep penetration during the insertion into soft objects or soft material.

In a method according to the invention for inserting an insertion body, in particular an abovementioned insertion body, into a part of a transportation container or a transportation receptacle device, in particular a pallet, the insertion body has an electronic or electromechanical transmitter and/or receiver device which is formed as an RFID tag or NFC tag. In this context, the insertion body is inserted into the corresponding section of the transportation receptacle device by means of a pneumatically, explosively/pyrotechnically or electrically driven insertion device. Such insertion devices are known; they can be used to insert, for example, nails or bolts in a time-saving and practical fashion.

The insertion body can advantageously be inserted completely into its target, with the result that it no longer protrudes beyond an outer side of the transportation receptacle device, in particular is no longer visible. It is therefore also not disruptive. In addition, it is then also virtually impossible to remove.

These features and further features emerge from the claims, the description and the drawings, wherein every feature can each be implemented alone or a plurality thereof can be combined in the form of secondary combinations in an embodiment of the invention and in other fields, and can form advantageous embodiments for which protection can be obtained per se and for which protection is claimed here. The division of the application into individual sections as well as subheadings does not limit the general validity of the statements made in said sections and under said subheadings.

BRIEF DESCRIPTION OF THE DRAWINGS

Exemplary embodiments of the invention are illustrated schematically in the drawings and will be explained in more detail below. In the drawings:

FIGS. 3 and 4 show refinements of the insertion body in respect of the external design, FIG. 5 shows a schematic illustration of the method with which an inventive assembly of insertion bodies is inserted by a user into a stack of pallets by means of an insertion device, FIG. 6 shows plan views of a single insertion body, modified once more, both individually and as an assembly, FIG. 7 shows side views of the insertion bodies in FIG. 6, and FIGS. 8 to 11 show modifications of an insertion body in a sectional illustration with ferritic material as a screening element on an RFID tag together with an antenna.

DETAILED DESCRIPTION OF THE EXEMPLARY EMBODIMENTS

Figure 1:
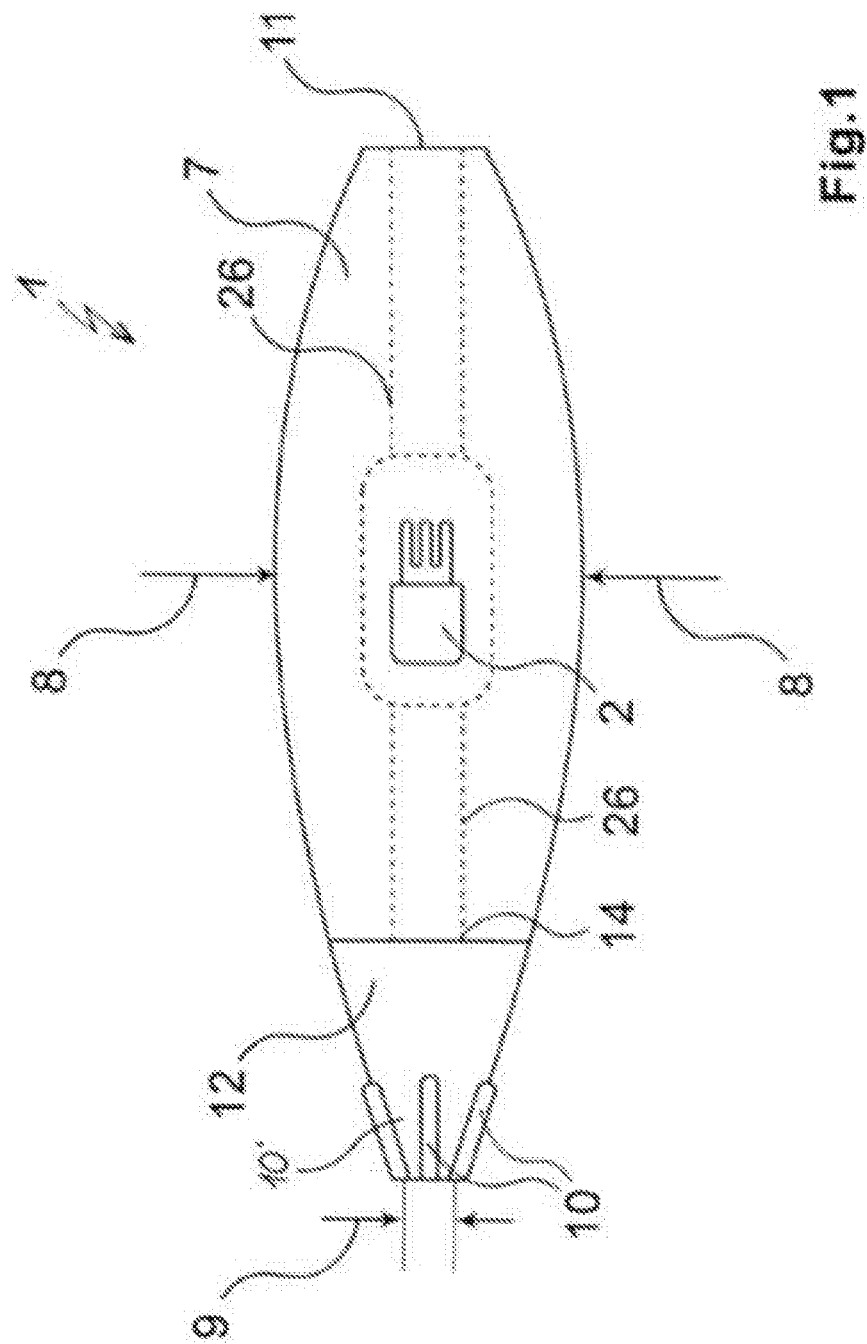
FIG. 1 shows a side view of an insertion body with an RFID tag therein.

FIG. 1 illustrates an insertion body 1 with an RFID tag 2 which has been encapsulated by injection molding or encased. This RFID tag 2 can already be encased before the encapsulation by injection molding, for example by plastic with a glass jacket or a jacket made of stable material, and in this way the electronics or electromechanical parts can be protected against physical external influences such as, for example, moisture. Said RFID tag 2 can have an antenna (not illustrated separately here) as is customary and advantageous. The dividing line 14, which enables the use of another material for the leftward-pointing tip 12 of the insertion body 1 and for the main body 7 to the right thereof is also illustrated in FIG. 1. The initial diameter 9 of the tip 12, which is reduced compared to a maximum diameter 8 of the main body 7, enables easier insertion, for example into wood, and reduces the splintering behavior in the case of wood through longitudinal fins 10. The tip 12 has, as it were, a flat tip surface 9, that is to say is, as it were, formed in a somewhat blunt fashion with an abovementioned blunt front surface as a flat tip surface 9. Longitudinal grooves 10' which are formed by the longitudinal fins 10 extend between said longitudinal fins 10. The longitudinal fins 10 can additionally be applied or integrally formed onto the tip 12, that is to say they protrude beyond the actual contour of the tip 12. The latter is substantially made to extend further in the longitudinal grooves 10'.

A rear surface 11 of the main body 7 or of the insertion body 1 absorbs the insertion force in the direction of the tip 12 here, and therefore acts, for example, as a percussion hammer or a propellant charge. An internal duct 26 can, after the removal of the tip 12 or after access through the depression (not shown in FIG. 1), permit access to the RFID tag 2 for example for the purpose of disposal or recycling. The internal duct 26 runs as far as the dividing line 14, that is to say as far as the tip 12.

This insertion body 1 therefore has a shape which is not cylindrical and does not have a constant diameter over a large part or significant part of the length, but is, as it were, cambered.

Figure 2:
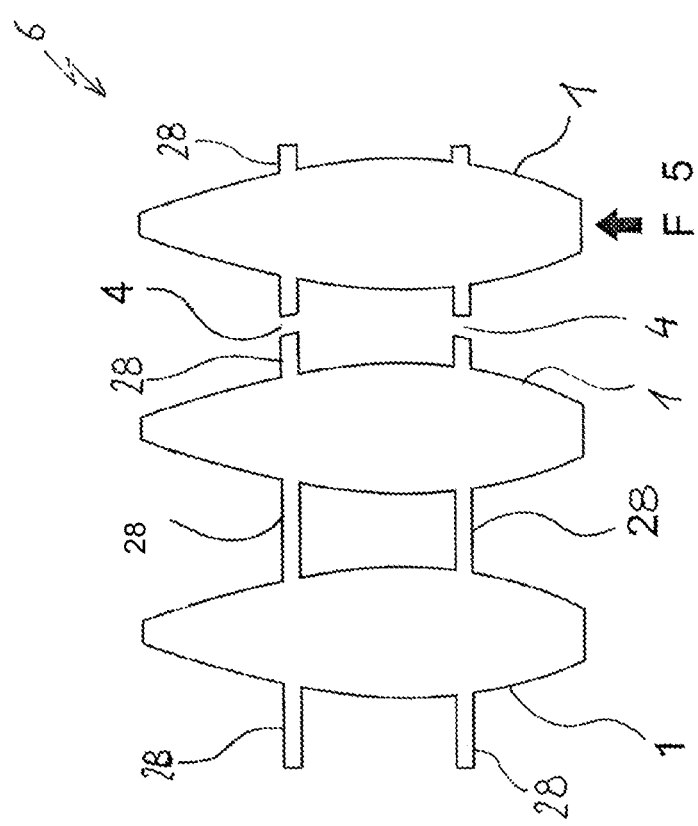
FIG. 2 shows an inventive assembly of insertion bodies which has been combined by injection molding with connecting elements.

FIG. 2 illustrates an assembly 6 of a plurality of insertion bodies 1 according to FIG. 1, in particular the web-like connecting elements 28 between the individual insertion bodies 1. FIG. 2 also illustrates the separation or the fracturing 4 of these connecting elements 28 in the event of the occurrence of the force F which illustrates the actual impact process or the application of force to the insertion body 1. As a result, at the moment of the impact or the occurrence of the force, the fracturing 4 of these connecting elements 28 is brought about and therefore the release of the insertion body 1 from the rest of the assembly 6 and therefore the discharging of a single insertion body 1 is made possible. It is apparent that on the other side of the insertion body 1, the remains of the connecting elements 28 which previously connected to the previously adjacent insertion body 1 are present. However, this does not disrupt the insertion; these short protrusions can tear off or be pulled off when penetration into the object or material occurs during the insertion process.

FIG. 3 illustrates the possible configuration of the cross-section according to section A-A of an alternative insertion body 101. Starting from the largest diameter of the insertion body 101, the recesses 116 cover, in the manner of longitudinal fins, a region 15 in front of and behind this largest diameter. The section A-A which is illustrated on the left shows an example of a possible shape for defined fitting with a corresponding opening in the material which is to be fired into.

FIG. 3 also illustrates a depression 118 with an opening 117 at the rear end of the insertion body 101. Here, a tool for removing the insertion body 101 can be applied.

FIG. 4 illustrates, in yet another alternative insertion body 201, a disk-shaped platform 219 or processing at the end 211 which serves as stop for limiting the penetration depth. The opening 117 which is described in FIG. 3 and the subsequent depression 118 are not adversely affected in their function by the platform 219, they can pass through.

FIG. 5 illustrates the exemplary method of functioning during the insertion process. An operator 22 applies an automatic, pneumatically operated insertion device 20, supplied with compressed air via the compressed air hose 21 to a single pallet 25 of a pallet stack 23. An assembly 6 of insertion bodies 1 corresponding to FIG. 2 is inserted into the insertion device. The operator advantageously applies the insertion device 20 to an edge block or corner block of the pallet 25. By pressing a trigger 24 of the insertion device 20, a single insertion body 1 is torn away from the assembly 6 and shot into a corner block of the pallet 25. The rapid changeover to a pallet 25 lying below, in order to discharge the next shot and introduce the next insertion body 1 into this pallet 25 lying below is also apparent from FIG. 5. The shooting always advantageously takes place into an edge block or corner block at the same position of a pallet 25, so that the identification becomes easier afterwards.

Writing to and/or reading out an RFID tag 2 in the interior of the insertion body 1 can be carried out in a known fashion. The fact that the RFID tag 2 is fitted into the wooden material or pressboard material of the pallet 25 does not cause disruption here.

An alternative form of an insertion body 301 is illustrated in a plan view in FIG. 6 and in a side view in FIG. 7. Said insertion body 301 has an elongate and cylindrical main body 307 which takes up the greater part of the length of the insertion body 301, in particular approximately 80%. In this main body 307 there is an RFID tag (not illustrated here) as described above. Further possibilities such as an internal duct or a specific jacket of an RFID tag can also quite obviously be provided.

On the left, each insertion body 301 has a tip 312 whose shape can be seen clearly together with the front views in FIG. 6. Four longitudinal fins 310 protrude in a distributed fashion to the rear from a front surface 309 or an initial diameter which is described at the beginning, and together they form a tip 312 which corresponds approximately in the manner of a crosshead screwdriver, in particular as is optimized for Spax® screws. This special shape has proven very advantageous for inserting an insertion body 301 into pressboard, such as is frequently used nowadays as an edge block or corner block or pallets. The four longitudinal fins 310 are actually formed by four longitudinal grooves 310' which are formed as indents in the tip 312. These longitudinal grooves 310' therefore run here, as can generally be advantageous, into the circumference or the outer surface of the tip 312 or are formed therein, with the result that the longitudinal fins 310 are produced or remain. They are therefore not applied specially, as can be the case in the embodiment in FIG. 1.

While FIGS. 6 and 7 each illustrate at the top a single insertion body 301 for the sake of better clarity, an assembly 306 composed of a plurality of insertion bodies 301, each connected to one another by means of two connecting elements 328, is illustrated below. As has been described at the beginning, the insertion bodies 301 can be manufactured together as an assembly 306, in particular in a common injection molding method. Such an assembly 306 can comprise between ten and twenty up to thirty or even forty insertion bodies 301.

Furthermore, it is generally possible to hold together an assembly of insertion bodies not with two connecting elements but rather only with one connecting element or with three or even four connecting elements.

At the same time, it is apparent, in particular from FIGS. 2 and 7, that these insertion bodies, in particular the cylindrical elongate ones in FIG. 7, do not necessarily have to be inserted into a coherent assembly in order to be able to insert them with an insertion device 20 according to FIG. 5. It would also be possible, as has been described at the beginning, to insert them into a special magazine similarly to a magazine of a semi-automatic or automatic firearm and then move each one individually into the insertion device by means of a corresponding transportation mechanism and to insert them into a pallet. The filling or operation of such a magazine can then be carried out as in the case of such a known firearm.

FIG. 8 illustrates an insertion body 401 in cross-section, for example with a basically similar external shape corresponding to FIG. 7. The insertion body 401 has, approximately on the longitudinal central axis, an RFID tag 402 together with the antenna 403, which is illustrated here. The insertion body 401 is largely composed of an abovementioned plastic 430 which encases the RFID tag 402 together with the antenna 403. Furthermore, ferritic material 432 is present as a type of abovementioned screening element or is provided in the manner of a shield or in fact a screening element, and is advantageously injection molded from a plastic which is enriched or mixed with ferritic powder or granulate. The ferritic material 432 as a screening element should be completely within the insertion body 401 and therefore the plastic 430. It can be curved as illustrated here and form a quarter circle. The optimum screening effect is obtained here in an upward direction. The insertion body from FIG. 8 should therefore be inserted into a pallet 25 in accordance with FIG. 5 in such a way that the ferritic material 432 is positioned as a screening element above the RFID tag 402. Therefore, the antenna 403 is also at least partially screened in the upward direction. The insertion body 401 in FIG. 8 can be a single insertion body or else can be connected in an assembly be with further with further insertion bodies, advantageously injection molded together, according to FIG. 7, that is to say by means of connecting elements.

A previously described notch or depression 434 is also illustrated here by dashes. Said notch or depression 434 runs in a direction perpendicular to a longitudinal central axis of the insertion body 401. It ensures that the insertion body 401 is precisely or correctly positioned when inserted into an insertion device. It would also be possible to provide two depressions 434 for good guidance during the insertion into the insertion device.

In the insertion body 401 in FIG. 9, the ferritic material 432 forms a semicircle, as it were as an approximately further curved screening element compared to FIG. 8. The optimum screening effect also occurs here in an upward direction, and the insertion body should therefore be inserted precisely in this way. The ferritic material 432 is then positioned over the RFID tag 402 together with the antenna 403.

In the insertion body 401 in FIG. 10, the ferritic material 432 has a straight extent and for this purpose rests on the antenna 403. This could therefore very easily be prefabricated as one component, which is then encapsulated by injection molding with the plastic 430. A previously mentioned notch or depression 434 is also illustrated here by dashes. The said notch or depression 434 also runs in a direction perpendicular to a longitudinal central axis of the insertion body 401. There are advantageously two notches or depressions 434 here, one in front of and one behind the antenna 403 together with the ferritic material 432.

In the insertion body 401 in FIG. 11, the shape of the ferritic material 432 is similar to that in FIG. 8, that is to say a quarter circle. However, the screening element runs over the antenna 403 or overlaps it, said antenna 403 being made somewhat shorter here. Therefore, a screening in the upward direction is once more improved significantly, as is clearly apparent in comparison with FIG. 8.

The invention claimed is:

1. An insertion body for insertion into a transportation receptacle device, the insertion body having an elongate extending along a longitudinal central axis and being tapered along at least one tip; and wherein the insertion body has an electronic or electromechanical transmitter and/or receiver device, the electronic or electromechanical transmitter and/ or receiver device comprising an RFID tag or NFC tag, wherein the tip of the insertion body has at least two longitudinal grooves which run in planes along the longitudinal central axis of the insertion body.

2. The insertion body as claimed in claim 1, wherein magnetizable or ferritic material is arranged in the insertion body, adjacent to the electronic or electromechanical transmitter and/or receiver device and/or an antenna of the transmitter and/or receiver device.

3. A method for inserting an insertion body as claimed in claim 1, into a section of a transportation container or a transportation receptacle device, the method comprising: inserting the insertion body into the section of the transportation receptacle device with a pneumatically, pyrotechnically or electrically driven insertion device.

4. The method as claimed in claim 3, wherein the insertion body is inserted completely, with a result that the insertion body does not protrude beyond an outer side of the transportation receptacle device.

5. The method as claimed in claim 4, wherein the insertion body is inserted completely, with a result that said insertion body is no longer visible.

6. The insertion body as claimed in claim 1, wherein the insertion body comprises a tapered tip, and wherein the longitudinal grooves extend along the tapered tip, and wherein longitudinal fins having a constant width are positioned between the longitudinal grooves.

7. The insertion body as claimed in claim 2, wherein magnetizable or ferritic material is formed as a curved surface with a size which is greater than said transmitter and/or receiver device and in such a way that said magnetizable or ferritic material projects beyond said transmitter and/or receiver device in one direction, protruding laterally everywhere or in such a way that it screens said transmitter and/or receiver device.

8. An assembly of a plurality of insertion bodies, wherein each insertion body has an electronic or electromechanical transmitter and/or receiver device, wherein the electronic or electromechanical transmitter and/or receiver device comprises an RFID tag or NFC tag,
wherein the insertion bodies are connected to one another next to one another or one behind the other by means of one or more connecting elements, wherein the connecting elements are adapted to be torn off mechanically by an external force effect on a single insertion body,
wherein the insertion bodies and the connecting elements are composed of the same material and are fabricated in an injection molding method in a same process.

9. The assembly as claimed in claim 8, wherein the connecting elements are adapted to be mechanically torn off by an external force effect on a single insertion body when the insertion body is inserted with a driven insertion device.

10. The assembly as claimed in claim 8, wherein the insertion bodies are arranged in series and connected to one another and form magazines in a linear, circular or spiral-shaped arrangement for a pneumatic or electrical nail gun device or bolt gun device as an insertion device.

11. The assembly as claimed in claim 8, wherein the insertion bodies are of tapered design at an end facing away from a tip.

12. The assembly as claimed in claim 11, wherein said tapering is of a diameter at least 5% and up to 50%.

13. The assembly as claimed in claim 8, wherein each insertion body comprises a tip that is flattened or tapered by up to 25% of a maximum diameter of the insertion body.

14. The assembly as claimed in claim 8, wherein each insertion body has a tapered tip comprising at least two longitudinal grooves running in planes along a longitudinal center axis of the insertion body, and wherein longitudinal fins are positioned between the longitudinal grooves, and wherein the longitudinal fins have a constant width.

15. The assembly as claimed in claim 8, wherein each insertion body has a length extending along a central longitudinal axis to a tapered tip, wherein, with exception of the tapered tip, the insertion body has a cylindrical and straight design with respect to the central longitudinal axis over at least 50% of its length.

16. The assembly as claimed in claim 8, wherein each insertion body has a length extending along a central longitudinal axis, wherein a front region of each insertion body comprises a harder material than a material of a rear part of the insertion body, wherein the front region is connected in a positively locking and frictionally locking fashion to the rear part.

17. The assembly as claimed in claim 8, wherein each insertion body has, in cross-section, symmetrically or asymmetrically arranged longitudinal grooves, said longitudinal grooves extending at least beyond a length part of a maximum diameter of said insertion body.

18. The assembly as claimed in claim 8, wherein the insertion bodies have, at the end opposite a tip, an opening with a depression which lies behind it and dimensioned to receive a tool with which the insertion body can be removed from an object which is equipped with the insertion body.

19. The assembly as claimed in claim 18, wherein the transmitter and/or receiver device is moved into an interior of the insertion body through a duct via the depression, and is removed again in the same way.

20. The assembly as claimed in claim 18, wherein said transmitter and/or receiver device is moved into an interior of said insertion body through a front region separating surface, and is removed in the same way.

21. The assembly as claimed in claim 8, wherein the transmitter and/or receiver device is placed in a sheath and is incorporated by injection molding in the insertion body by means of the sheath.

22. The assembly as claimed in claim 8, wherein the insertion body has, at an end opposite a tip, a disk-shaped platform positioned as a stop for limiting a penetration depth into the object which is to be equipped with the insertion body.

23. A method of inserting an insertion body of the assembly of claim 8 into a section of a transportation container or a transportation receptacle device, the method comprising inserting the insertion body into the section of the transportation receptacle device with a pneumatically, pyro-technically or electrically driven insertion device.

24. The method as claimed in claim 23, wherein the insertion body is inserted completely, with a result that said insertion body does not protrude beyond an outer side of the transportation receptacle device.

25. The method as claimed in claim 23, wherein the insertion body is inserted completely, with a result that said insertion body is no longer visible.

26. An assembly of a plurality of insertion bodies, wherein each insertion body has an electronic or electromechanical transmitter and/or receiver device, wherein the electronic or electromechanical transmitter and/or receiver device comprises an RFID tag or NFC tag,
wherein the insertion bodies are connected to one another next to one another or one behind the other by means of one or more connecting elements, wherein the connecting elements are adapted to be torn off mechanically by an external force effect on a single insertion body, wherein said insertion bodies are for insertion into a transportation receptacle device, each of said insertion bodies having an elongate extending along a longitudinal central axis and being tapered along at least one tip.

\* \* \* \* \*